(12) United States Patent
Cohen-Solal et al.

(10) Patent No.: US 6,674,458 B1
(45) Date of Patent: Jan. 6, 2004

(54) METHODS AND APPARATUS FOR SWITCHING BETWEEN A REPRESENTATIVE PRESENCE MODE AND ONE OR MORE OTHER MODES IN A CAMERA-BASED SYSTEM

(75) Inventors: Eric Cohen-Solal, Ossining, NY (US); Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 431 days.

(21) Appl. No.: 09/621,520

(22) Filed: Jul. 21, 2000

(51) Int. Cl.[7] ............................................. H04N 7/14
(52) U.S. Cl. ..................... 348/14.08; 348/14.01; 348/14.11
(58) Field of Search ................ 348/14.01, 14.02, 348/14.03, 14.05, 14.06, 14.07, 14.08, 14.09, 14.1, 14.11, 14.12, 14.13; H04N 7/14

(56) References Cited

U.S. PATENT DOCUMENTS

| | | | |
|---|---|---|---|
| 5,347,306 A | 9/1994 | Nitta | 348/15 |
| 6,414,707 B1 * | 7/2002 | Agraharam et al. | 348/14.07 |
| 6,466,250 B1 * | 10/2002 | Hein et al. | 348/14.16 |
| 6,483,531 B1 * | 11/2002 | Ryu | 348/14.01 |

FOREIGN PATENT DOCUMENTS

| | | | |
|---|---|---|---|
| EP | 0781049 A2 | 12/1996 | H04N/7/173 |
| JP | 06327009 A | 11/1994 | H04N/7/15 |
| JP | 07255044 A | 10/1995 | H04N/7/15 |
| JP | 10126796 A | 5/1998 | H04N/9/04 |
| JP | 2000032422 A * | 1/2000 | H04N/7/15 |
| WO | WO9957900 | 5/1999 | H04N/7/14 |
| WO | WO9930495 | 6/1999 | H04N/7/15 |

* cited by examiner

Primary Examiner—Melur Ramakrishnaiah

(57) ABSTRACT

A camera-based system includes a number of sites, each having a camera associated therewith. A processing system processes a video signal received from a camera at a given one of the sites, and provides a controlled switching between a representative presence mode and at least one other mode for presentation, at one or more of the sites remote from the given site, of corresponding output video associated with the given site. The processing system utilizes information derived from the video signal generated by the camera to control the switching between the representative presence mode and the other mode, which may be, e.g., a live video mode. For example, the processing system may process the video to identify a user of the system, retrieve a corresponding user profile, and control the switching between the modes in accordance with information in the retrieved user profile.

21 Claims, 3 Drawing Sheets

METHODS AND APPARATUS FOR SWITCHING BETWEEN A REPRESENTATIVE PRESENCE MODE AND ONE OR MORE OTHER MODES IN A CAMERA-BASED SYSTEM

FIELD OF THE INVENTION

The present invention relates generally to the field of video signal processing, and more particularly to video signal processing techniques for use in camera-based systems.

BACKGROUND OF THE INVENTION

As is well known, existing video conferencing systems can be configured to provide two-way video and audio communication between multiple sites. Such systems may allow continuous video communication between the sites, an arrangement that is referred to as a "video presence" or "live video" mode. A problem with this type of arrangement is that the uninterrupted presentation of live video from a given one of the sites to one or more of the other sites can be considered invasive to those present at the given site. The problem is particularly apparent in applications in which the given site corresponds to the home or office of a particular individual, as opposed to a conference room or other facility specifically designed for video conferences. In such home or office applications, privacy concerns may preclude the use of video presence.

The above-noted privacy concerns are addressed to a certain extent in conventional video conferencing systems that may be configured to utilize an approach referred to as "representative presence." Representative presence generally allows users participating in a video conference or other similar arrangement to be represented in a particular manner in a video signal displayed to remote participants. Each of the users may be provided with a certain amount of control over the manner in which they are represented in the displayed signal.

An example of the conventional use of representative presence in a video conferencing application is described in U.S. Pat. No. 5,347,306, entitled "Animated Electronic Meeting Place" and issued Sep. 13, 1994 to Tohei Nitta. In this example, a network-based animated electronic meeting place includes a terminal for each participant on the network and local prestored animation graphics, with simulated participants in the form of animated characters or dolls being driven through sensing of each of the participants at their respective work stations, including their position, posture, gestures, audio content and optionally that persona which each individual wishes to be displayed at the animated electronic meeting place. A given user can thus choose how he or she represents himself or herself on the screen through the use of a persona or character control.

Although representative presence modes and live video modes have been implemented independently in the above-noted conventional systems, these systems fail to provide adequate techniques for switching between a representative presence mode and a live video mode within a given system.

SUMMARY OF THE INVENTION

The present invention provides methods and apparatus for automatic or semi-automatic switching between a representative presence mode and one or more other modes, such as a live video mode, in a video conferencing system or other camera-based system. In accordance with one aspect of the invention, a camera-based system includes a number of sites, each having a camera associated therewith. A processing system processes a video signal received from a camera at a given one of the sites, and provides controlled switching between a representative presence mode and at least one other mode for presentation, at one or more of the sites remote from the given site, of corresponding output video associated with the given site. The processing system utilizes information derived from the video signal generated by the camera to control the switching between the representative presence mode and the one or more other modes. The representative presence mode may be established as a default mode for presentation, at the one or more remote sites, of output video associated with the given site.

In accordance with another aspect of the invention, the processing system may process the video signal generated by the camera to identify a user of the system. The processing system then retrieves a corresponding user profile, and controls the switching between the modes in accordance with information in the retrieved user profile. In other embodiments, the processing system may identify the user at least in part through the utilization of speech recognition techniques.

In accordance with a further aspect of the invention, the processing system at the given site may determine at least one characteristic of the output video presented to the one or more remote sites in the representative presence mode at least in part based on information in the retrieved user profile.

In accordance with yet another aspect of the invention, the processing system at the given site may be configured to provide an indication to a user at the given site regarding whether presentation of video associated with the given site at the one or more remote sites is in accordance with the representative presence mode or one of the other modes.

Advantageously, the present invention permits efficient and accurate switching between a representative presence mode and a live video mode in a video conferencing system or other camera-based system application. These and other features and advantages of the present invention will become more apparent from the accompanying drawings and the following detailed description.

DETAILED DESCRIPTION OF THE INVENTION

The present invention in an illustrative embodiment provides techniques for switching between a representative presence mode and a live video mode in a camera-based system. Advantageously, the switching between the modes can be performed in an automatic or semi-automatic manner. For example, in the illustrative embodiment to be described below, a representative presence mode is configured as a default mode, and the system switches from this default mode to a live video mode and back automatically, based on the detection of certain types of activity at the corresponding site. The detected activity may include, e.g., the presence of a particular person in a particular location and position within a given room. In such a case, a video signal generated by a camera at the site may be processed to identify the person, to retrieve a corresponding user profile, and to determine the appropriate mode and display characteristics to be used in generating a display for one or more remote sites. The switching may also or alternatively be implemented in a semi-automatic manner, in which case, e.g., certain user input may be required before the system performs a switching operation based on detected activity.

Figure 1:
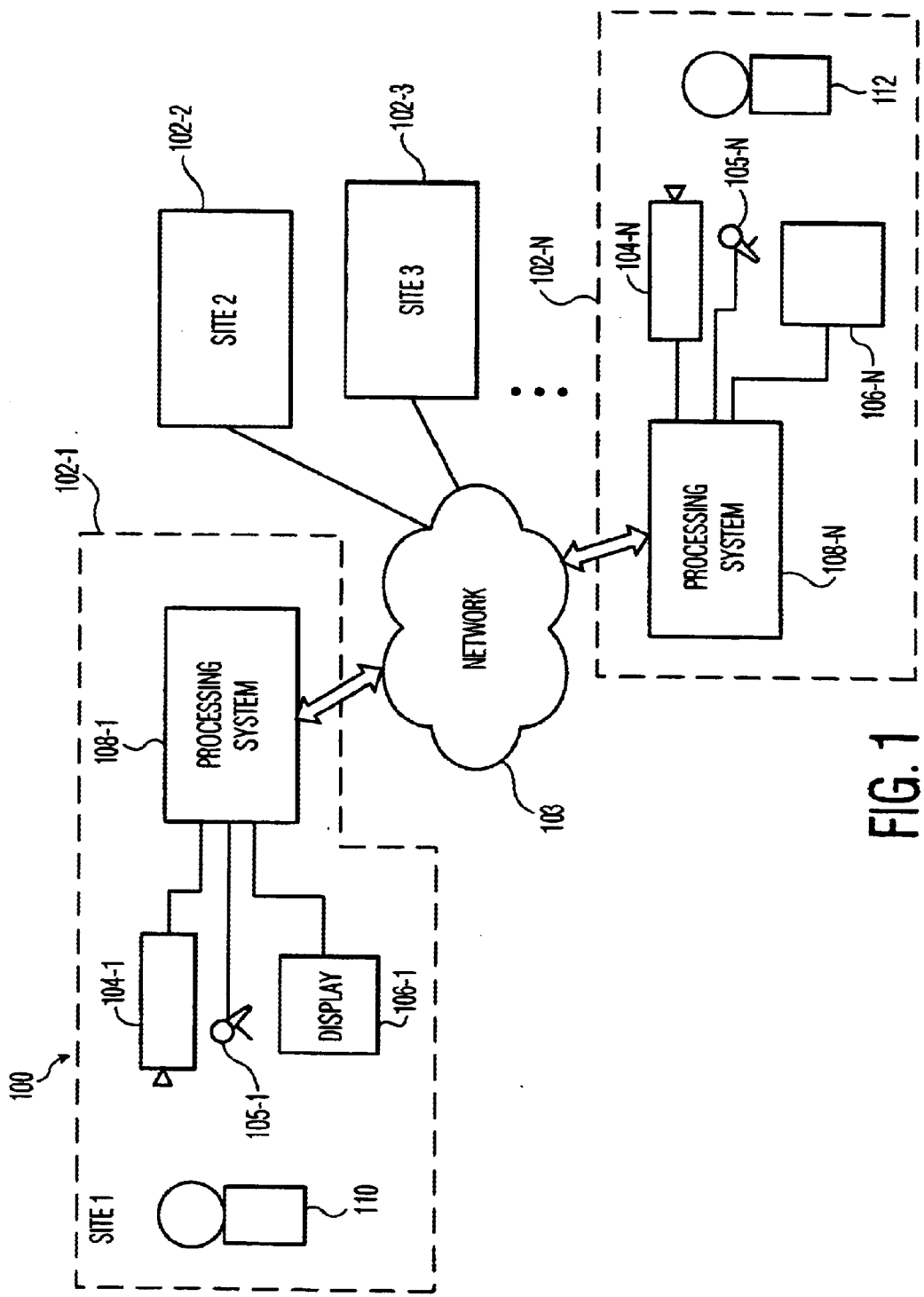
FIG. 1 is a block diagram of an illustrative embodiment of a camera-based system that incorporates switching between a representative presence mode and a live video mode in accordance with the invention.

FIG. 1 shows a camera-based system 100 in accordance with an illustrative embodiment of the invention. The system 100 includes a number of sites 102-1, 102-2, 102-3, . . . 102-N, each connected to communicate over a network 103. Each site is configured to include a camera 104-i, a microphone 105-i, a display 106-i, and a processing system 108-i, i=1, 2, 3, . . . N. A given processing system 108 is coupled to and controls the operation of its corresponding camera 104, microphone 105, and display 106.

One or more users may be associated with each of the sites 102-i. For example, as shown in the figure, a user 110 is associated with the site 102-1 and a user 112 is associated with the site 102-N.

In operation, the system 100 supplies a video signal from the processing system 108 associated with a given one of the sites 102-i to the processing systems of one or more of the other sites. These other sites are also referred to herein as remote sites relative to the given site. It should be understood that the term "remote" as used herein is intended to include not only sites that are geographically remote from the given site, but also sites that may be co-located with the given site, e.g., in other rooms of a building, other buildings of a facility, etc.

In accordance with the invention, the video signal supplied by the processing system 108 of the given site for presentation at one or more of the other sites may be selected as either a live video signal or a representative presence video signal, based on automatic or semi-automatic processing of video or other information generated at the given site.

The cameras 104 in the system 100 of FIG. 1 may comprise, e.g., fixed-view cameras, mechanical zoom cameras, electronic zoom cameras, pan-tilt-zoom (PTZ) cameras, etc. All of the cameras of the system 100 need not be configured in the same manner, i.e., a given implementation of the system 100 may include a wide variety of different types of cameras. The term "camera" as used herein is intended to include any type of image capture device which can be used in conjunction with the mode switching techniques of the invention. The cameras 104 may generate video signals that are supplied to the corresponding processing systems 108. The video signals may be generated by the cameras 104 in an analog form, and subsequently converted to a digital form using elements of the processing systems 108, such as analog-to-digital converters associated with the processing systems 108. Alternatively, the cameras may be digital network cameras, Internet protocol (IP) cameras or other types of digital cameras configured to generate video signals in a digital form.

Although only a single camera is shown at each of the sites in the FIG. 1 embodiment, other embodiments may include multiple cameras at each site, e.g., pairs of cameras arranged at each site so as to provide the system with an ability to compute depth information. Similarly, multiple microphones may be included at each of the sites 102 in FIG. 1. In addition, other types of devices not shown in FIG. 1 may also be used in conjunction with the cameras and microphones, such as motion detectors, audio locator devices, etc. It is also possible that the camera, microphone and at least part of the processing system at a given site may be combined into a single device.

Each of the displays 106 may be configured to provide a presentation of one or more output video signals generated by the corresponding processing systems 108. For example, each of the displays 106 may display various combinations of video signals generated by particular ones of the sites 102, including both live video and representative presence video signals, in accordance with the mode switching of the invention. An example of such a display will be described in greater detail below in conjunction with FIG. 3.

A given one of the processing systems 108 receives the input video signals as generated by the cameras 104, processes the received signals in a manner to be described in greater detail below, and generates appropriate output video signals for presentation on a corresponding one of the displays 106. As noted above, one or more of the output video signals may include representative presence type arrangements configured in accordance with the techniques of the invention.

It should be noted that certain elements or groups of elements of the camera-based system 100 of FIG. 1 may represent corresponding elements of an otherwise conventional computer, set of computers, or video conferencing system, as well as portions or combinations of these and other processing devices or systems. Moreover, some or all of the functions of the processing systems 108 may be implemented using an application specific integrated circuit (ASIC), a programmed microprocessor, microcontroller or digital signal processor (DSP), a circuit card, etc. that is incorporated into a computer, television, set-top box or other type of processing device.

Figure 2:
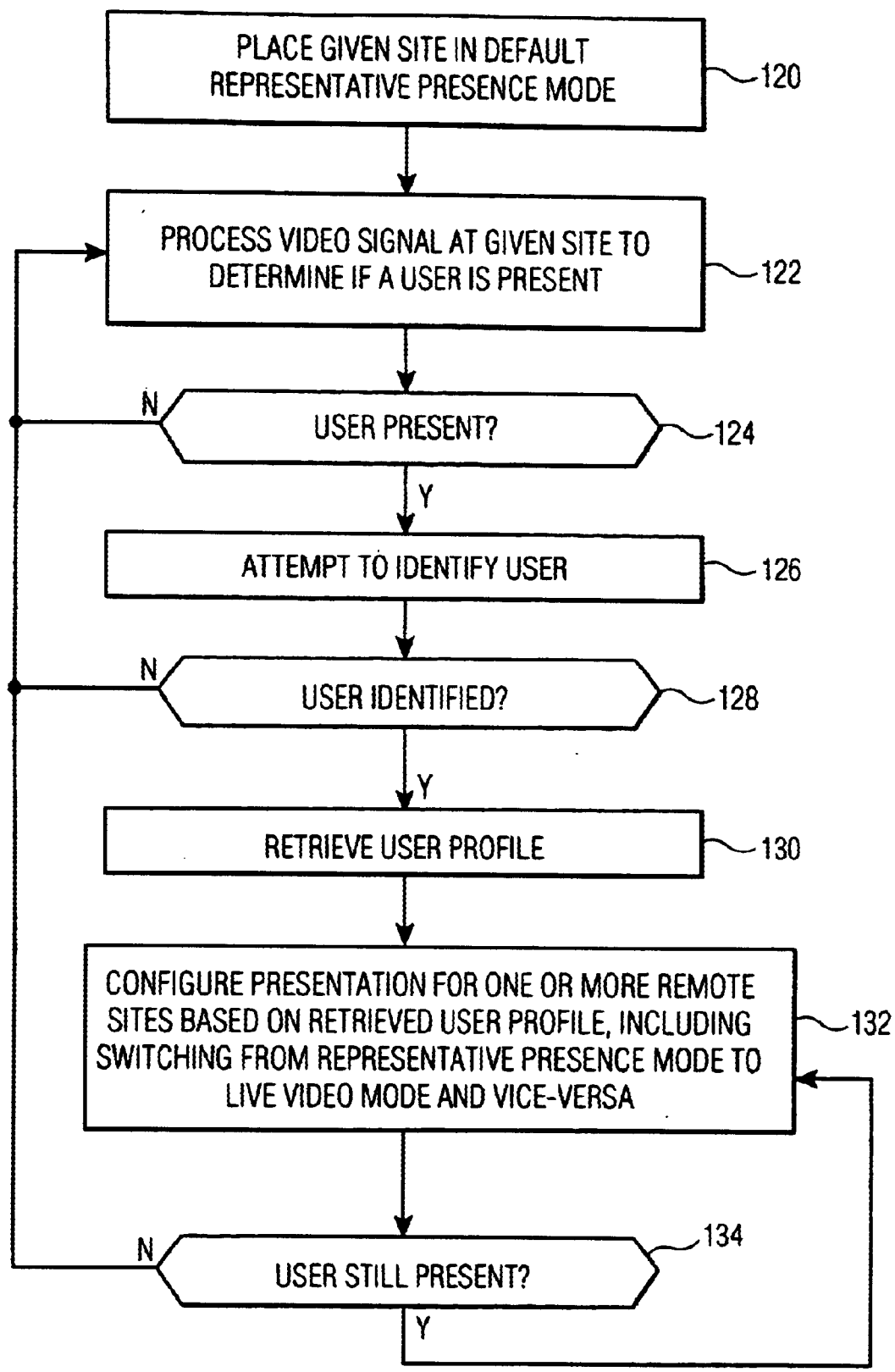
FIG. 2 is a flow diagram illustrating a switching operation that may be implemented in the camera-based system of FIG. 1 in accordance with the invention.
Figure 3:
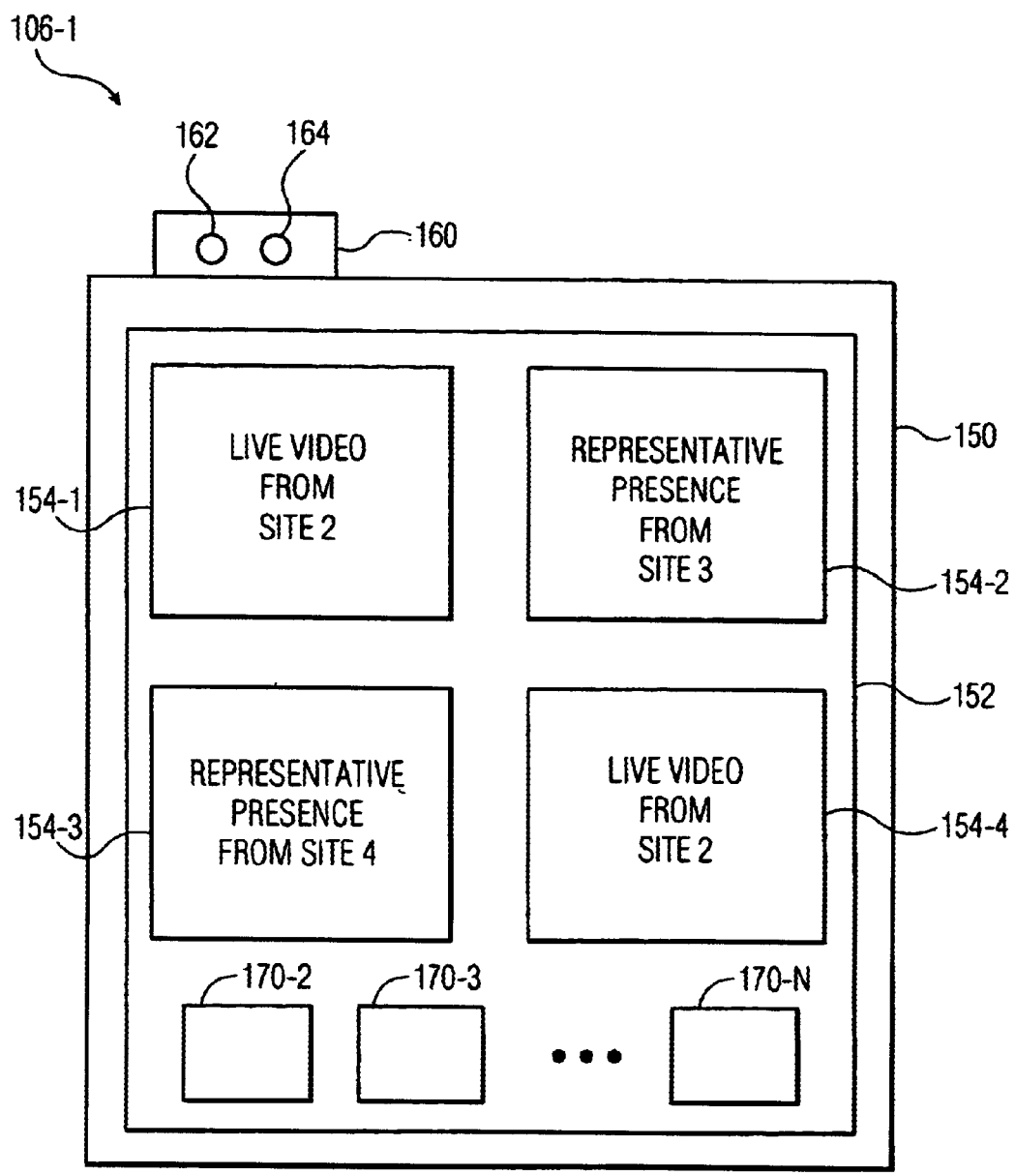
FIG. 3 shows an example of a display suitable for use in conjunction with the present invention.

The processing systems 108 are configured to execute system software to implement the mode switching techniques described herein in conjunction with FIGS. 2 and 3. Each of the processing systems 108 may thus include one or more microprocessors, central processing units, microcontrollers, DSPs or any other data processing element suitable for performing the mode switching functions described herein, as well as portions or combinations of such elements. Also, the processing systems 108 may each be configured to include a memory for storing at least a portion of the above-noted system software. These memories may comprise one or more electronic memories, disk-based memories, or other types of memories, as well as portions or combinations of these and other storage devices.

FIG. 2 is a flow diagram illustrating a mode switching process of the invention that may be implemented in the system 100 of FIG. 1. In step 120, a given site 102-i is placed in a default mode which in this embodiment corresponds to a representative presence mode. In this default mode, each of the sites 102 that are remote from the given site will display a representative presence type of video signal from the given site in place of a live video signal from the given site. The particular characteristics of the representative presence video signal to be displayed to the remote sites may be controlled by a user at the given site, e.g., as a part of a user profile stored for that user in a corresponding one of the processing systems 108.

In accordance with an aspect of the invention, when a representative presence video signal from a given site is to be displayed at one or more of the remote sites, the actual representative presence video signal itself is not sent from the given site to each of the remote sites. Instead, suitable identifying information may be sent from the given site to each of the remote sites, such that the remote sites in response to receipt of the identifying information each display the appropriate representative presence signal as desired by the given site. For example, a number of different types of representative presence video signals may be pre-stored at each of the sites, or a modifiable representative presence signal may be stored at each of the sites, such that a given site need only identify the selection of a particular one of the pre-stored signals, or particular characteristics of a modifiable signal, in order to have the remote sites display the desired representative presence signal for the given site. Such an approach preserves the privacy of the users at the given site while also preserving valuable system resources such as transmission bandwidth. References herein to transmission of a representative presence video signal are thus intended to include the transmission of identifying information for such a signal in place of the video signal itself. Of course, the actual representative presence video signal itself could be transmitted in a given embodiment of the invention.

It should also be noted that references herein to switching between a representative presence signal and a live video signal are intended to include switching between corresponding audio portions of the signals.

Referring again to FIG. 2, step 122 indicates that the video signal generated by the camera at a given site is processed to determine if a user is present. This step may be based on processing of the video signal generated by the camera at the given site. Other techniques may be used in conjunction with or in place of video signal processing, such as detection of a signal from a microphone, motion detection device, audio locator, etc. If step 124 indicates that there is no user present, the process returns to step 122, and continues to monitor the video signal for indications of user presence.

If step 124 indicates that a user is present, an attempt is made to identify the user. For example, well known conventional video processing techniques may be used to frame the face of the user within a given image, and to compare characteristics of the resulting image with stored information regarding known system users. These techniques include explicit identification as a particular user or "tagging" as a previous but not explicitly identified user, and may be based on characteristics such as height, face, color histogram signature, etc. The particular level of identification used in a given embodiment of the invention will generally vary in accordance with the specific needs of a given application.

As another example, the system may prompt the user for identification information using an appropriate voice prompt output signal from a speech generator. In this case, the user may respond to the voice prompt by stating his or her name, and the system performs speech recognition in order to convert the spoken name to an identifier that can be compared against a database of previously-stored user identifiers.

The system can also be configured to learn the characteristics of a particular user. For example, the user can place the system into a learning mode, using a voice command or a command generated using any other mechanism, such that the system processes video or voice information corresponding to the user and stores it for use in identifying that user upon a subsequent access to the system. Such techniques need not identify the user-explicitly, but may instead involve the above-noted "tagging" approach in which, e.g., a particular video or audio signature may be associated with the current user, without identifying exactly who that user is. In this manner, when that user subsequently accesses the system, the system will be able to identify the user without knowing specific user information such as name, etc. It will be apparent to those skilled in the art that numerous combinations of these and other techniques can be used to identify a particular user to the system.

If step 128 of FIG. 2 indicates that the user has been successfully identified, step 130 utilizes the user identification result to retrieve a user profile associated with the identified user. If the user has not been identified, the system returns to step 122. The system may be configured to notify such unidentified users that the system has been unable to recognize them, and that they should enter certain identifying information, go to a certain position in the room, or otherwise interact with the system in a designated manner through video prompts, voice prompts, gestures or the like. This allows the system to develop appropriate identifying information and corresponding user profiles for such unidentified users.

The user profile retrieved in step 130 includes information regarding the representative presence preferences of the corresponding user. For example, the user profile can include information specifying the type of representative presence signal to display to one or more of the remote sites. This information may include specification of a different representative presence signal for each of the remote sites. It may also include information relating to the preferred switching between a live video mode and a representative presence mode, such as times of the day or detectable activity situations for which either representative presence or live video should be activated automatically, times of the day or detectable activity situations for which particular types of representative presence signals should be displayed at the remote sites, etc.

The user profiles for a given one of the sites may be stored in a memory associated with the corresponding processing system of that site.

Step 132 configures the presentation for one or more of the remote sites based on the retrieved user profile. This configuration may include determining the appropriate live video mode or representative presence mode for all of the remote sites or designated subsets thereof. As part of this process, the system may switch between representative presence mode and live video mode in the presentation at one or more of the remote sites, in accordance with the preferences specified in the retrieved user profile.

The system in step 134 checks to determine if the user is still present. If the user is still present, the process returns to step 132, such that the switching between the representative presence mode and the live video mode continues to be controlled in accordance with the user profile and any detection of specified activities at the given site. If the system determines in step 134 that that the user is no longer present, the process returns to step 122 to attempt to detect another user in the video signal generated by the camera at the given site.

As previously noted, the switching between representative presence mode and live video mode in step 132 may be based on detection of certain types of activity at the given site. For example, the system may determine if the user has come within a designated proximity of the system and remained there for a certain period of time, thus indicating an intention to interact with one or more remote sites using a live video mode. As another example, the system can detect the presence of users in particular locations, such as in a chair, at a podium or on a couch within a given room. In this case, the user profile may specify that if the user is detected in a particular location or position within the room, a switch from the default representative mode to a live video mode should be automatically triggered. As a further example, certain users may prefer to operate in a live video mode when alone in the room. In such a case, the system automatically switches from the default representative presence mode to a live video mode once that user has been identified and the corresponding user profile retrieved and processed. Of course, numerous other scenarios are possible.

The system may also be configured to respond to user gestures, such as movement of the hand or arm in a particular manner, to control the switching between modes. These gestures may be defined for individual users or for groups of users as part of the above-noted user profiles. For example, a particular gesture may be designated as a command for the system to "lock" itself in a particular mode, such that further switching between modes is temporarily disabled. Another gesture can be designated for unlocking the system from this locked mode. Voice commands or other types of non-gesture commands can also be used to perform these functions.

FIG. 3 shows an example of a display that may be utilized at a given one of the sites in the camera-based system 100 of FIG. 1. For this example, it is assumed that the display shown in the figure is the display 106-1 associated with site 102-1, although the display in each of the other sites of the system could be configured in a similar manner. The display 106-1 in this example includes a monitor 150 having a screen 152 associated therewith. The screen is configured, electronically, structurally or otherwise, to include four separate display regions 154-1, 154-2, 154-3 and 154-4, each corresponding to a particular site remote from the site 102-1. More particularly, display regions 154-1 and 154-4 are displaying live video signals from remote site 2 (102-2) and remote site 5 (102-5), respectively, while display regions 154-2 and 154-3 are displaying representative presence video signals supplied or specified by remote site 3 (102-3) and remote site 4 (102-4), respectively.

Also associated with the display 106-1 is a set of indicator lights 160 which includes a first light 162 and a second light 164. The set of indicator lights 160 are intended to communicate to a user at the site 102-1 the particular manner in which the remote sites are viewing the site 102-1. For example, the light 162 may be a green light indicating to the user at site 102-1 that the site 102-1 is being displayed to each of the remote sites in a representative presence mode, while the light 164 may be a red light indicating to the user at site 102-1 that the site 102-1 is being displayed to at least one of the remote sites in a live video mode.

The display 106-1 of FIG. 3 further includes an additional set of display regions denoted 170-2, 170-3, . . . 170-N, each corresponding to one of the remote sites relative to site 102-1, i.e., sites 102-2, 102-3, . . . 102-N, respectively. A given one of the display regions 170 displays to the user at the site 102-1 the particular representative presence or live video signal that is currently being displayed at the corresponding remote site. This provides the user at the site 102-1 with a detailed view of the actual signals being presented at the remote sites.

Similar sets of lights 160 and display regions 170 may be implemented in the displays 106 at each of the sites 102, such that users at each of those sites can determine whether the remote sites are displaying live video or representative presence video for their local sites, and can also determine the particular types of signals being displayed.

The sets of lights 160 and display regions 170 thus provide constant feedback to the users at site 102-1 indicating the mode that they are currently operating in. Other types of feedback mechanisms can also be used.

Other embodiments of the invention may provide switching between a representative presence mode and multiple other modes, such as several different types of live video modes, or switching between multiple representative presence modes and multiple live video modes.

Although particularly well suited for use in video conferencing system applications, the present invention may be used in other applications, such as video monitoring, surveillance or security systems. Moreover, the particular type and arrangement of system elements shown in FIGS. 1 and 3 is by way of example only, and numerous alternative system configurations can be used to implement the mode switching techniques of the invention. For example, although the embodiment of FIG. 1 includes multiple processing systems, each associated with a corresponding site of the system in a distributed manner, the invention can be implemented using centralized processing, or various hybrid combinations of centralized and distributed processing. The term "processing system" as used herein is intended to include such alternative arrangements, e.g., one or more elements of a set of distributed processing systems, a complete set of distributed processing systems, or a centralized processing system. These and numerous other embodiments within the scope of the following claims will be apparent to those skilled in the art.

What is claimed is:

1. A camera-based system comprising:

at least one camera generating a video signal; and a processing system coupled to the camera and receiving the video signal therefrom, the camera being associated with a given one of a plurality of sites of the system, the sites other than the given site representing remote sites relative to the given site, the processing system being operative to process the video signal received from the camera, and to provide a controlled switching between a representative presence mode and at least one other mode for presentation, at the one or more remote sites, of corresponding output video associated with the given site, the processing system utilizing information derived from the video signal generated by the camera to control the switching between the representative presence mode and the at least one other mode.

2. The camera-based system of claim 1 wherein the representative presence mode is established as a default mode for presentation, at the one or more remote sites, of output video associated with the given site.

3. The camera-based system of claim 1 wherein the at least one other mode comprises a live video mode in which at least a portion of the video signal generated by the camera is presented at the one or more remote sites.

4. The camera-based system of claim 1 wherein the processing system is further operative to identify a particular user of the system.

5. The camera-based system of claim 4 wherein the processing system identifies the user of the system by processing the video signal generated by the camera.

6. The camera-based system of claim 4 wherein the processing system identifies the user at least in part through the utilization of speech recognition techniques.

7. The camera-based system of claim 4 wherein the processing system retrieves a previously-stored user profile associated with the identified user.

8. The camera-based system of claim 7 wherein the processing system controls the switching between the representative presence mode and the at least one other mode at least in part based on information in the retrieved user profile.

9. The camera-based system of claim 7 wherein the processing system determines at least one characteristic of the output video presented to the one or more other sites in the representative presence mode at least in part based on information in the retrieved user profile.

10. The camera-based system of claim 1 wherein the processing system provides an indication to a user at the given site regarding whether presentation of video associated with the given site at the one or more remote sites is in accordance with the representative presence mode or the at least one other mode.

11. A method for use in a camera-based system comprising a plurality of sites, a given one of the sites having a camera associated therewith, the sites other than the given site representing remote sites relative to the given site, the method comprising the steps of:

receiving a video signal from the camera; and processing the video signal received from the camera to provide a controlled switching between a representative presence mode and at least one other mode for presentation, at the one or more remote sites, of corresponding output video associated with the given site, said processing utilizing information derived from the video signal generated by the camera to control the switching between the representative presence mode and the at least one other mode, the receiving and processing steps being implemented in a processing system coupled to the camera.

12. The method of claim 11 wherein the representative presence mode is established as a default mode for presentation, at the one or more remote sites, of output video associated with the given site.

13. The method of claim 11 wherein the at least one other mode comprises a live video mode in which at least a portion of the video signal generated by the camera is presented at the one or more remote sites.

14. The method of claim 11 wherein the processing system is further operative to identify a particular user of the system.

15. The method of claim 14 wherein the processing system identifies the user of the system by processing the video signal generated by the camera.

16. The method of claim 14 wherein the processing system identifies the user at least in part through the utilization of speech recognition techniques.

17. The method of claim 14 wherein the processing system retrieves a previously-stored user profile associated with the identified user.

18. The method of claim 17 wherein the processing system controls the switching between the representative presence mode and the at least one other mode at least in part based on information in the retrieved user profile.

19. The method of claim 17 wherein the processing system determines at least one characteristic of the output video presented to the one or more other sites in the representative presence mode at least in part based on information in the retrieved user profile.

20. The method of claim 11 wherein the processing system provides an indication to a user at the given site regarding whether presentation of video associated with the given site at the one or more remote sites is in accordance with the representative presence mode or the at least one other mode.

21. An article of manufacture comprising a storage medium for storing one or more programs of a set of system software for controlling the operation of at least a portion of a camera-based system, the camera-based system comprising a plurality of sites, a given one of the sites having a camera associated therewith, the sites other than the given site representing remote sites relative to the given site, wherein the one or more programs when executed by a processing system of the camera-based system implement the step of:

processing a video signal received from the camera to provide a controlled switching between a representative presence mode and at least one other mode for presentation, at the one or more remote sites, of corresponding output video associated with the given site, said processing utilizing information derived from the video signal generated by the camera to control the switching between the representative presence mode and the at least one other mode.

* * * * *